Patented Jan. 24, 1928.

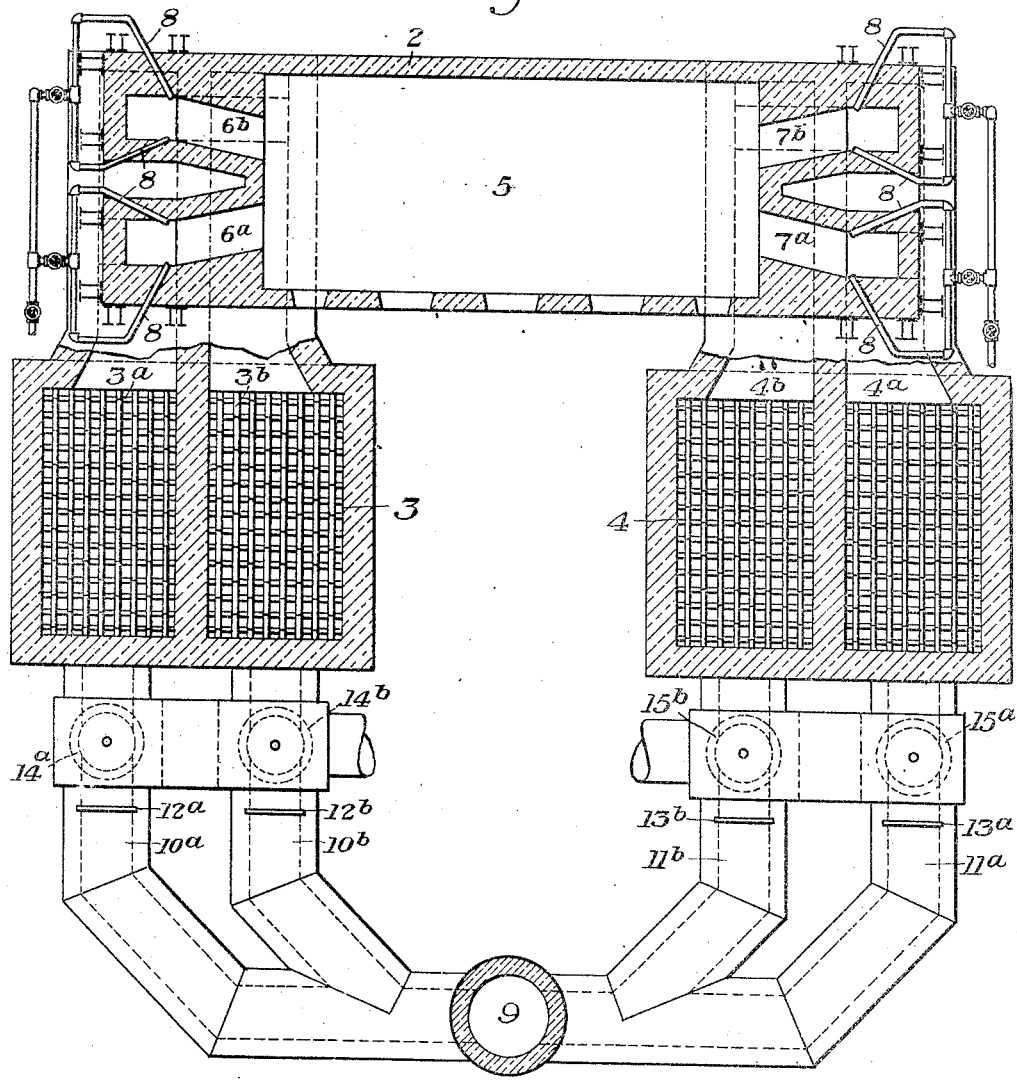

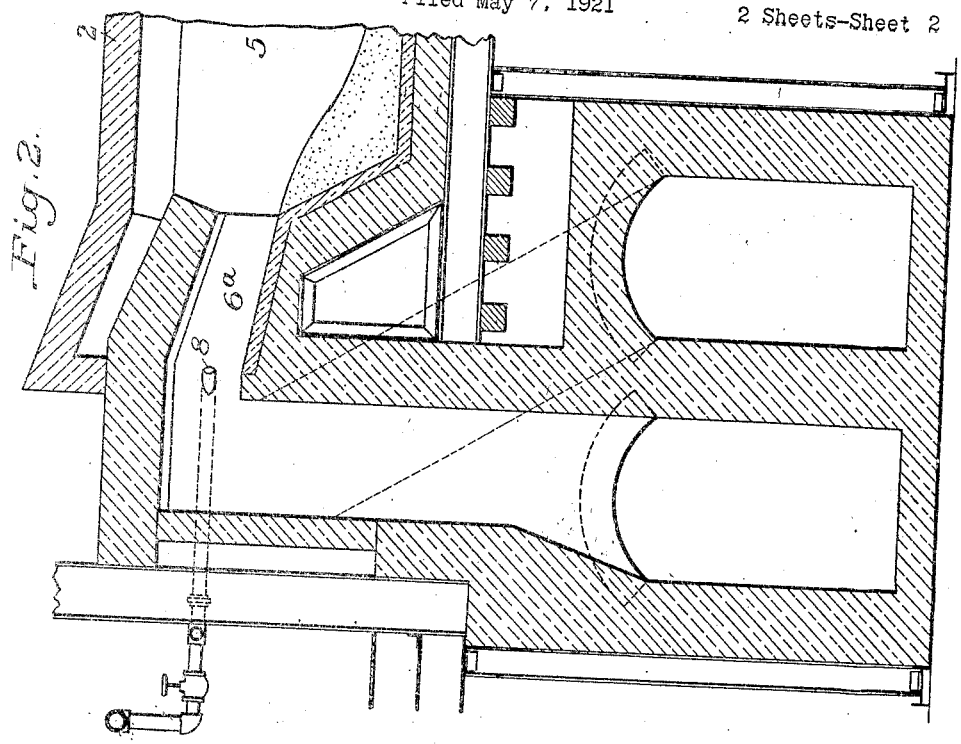
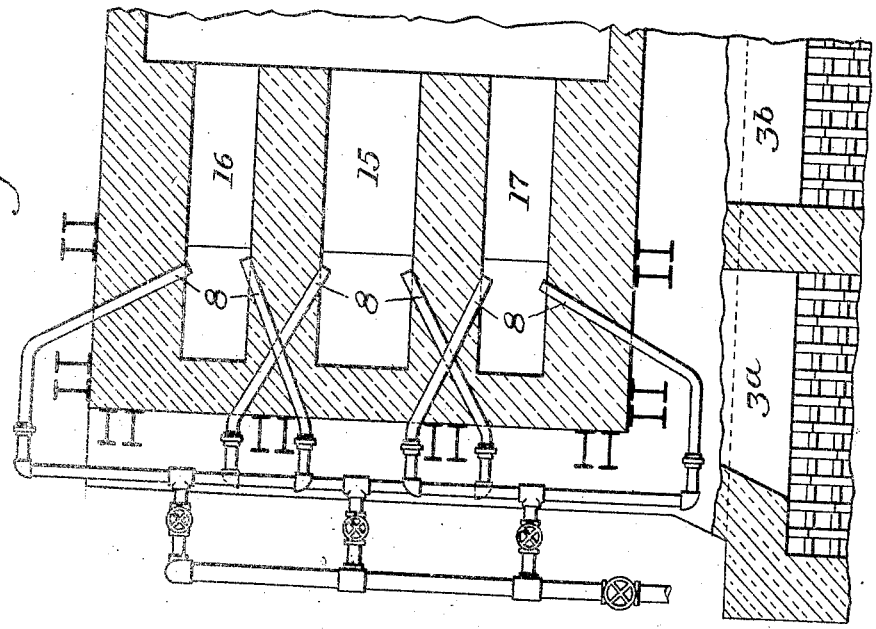

1,657,401

UNITED STATES PATENT OFFICE.

JULIAN KENNEDY, OF PITTSBURGH, PENNSYLVANIA.

REGENERATIVE REVERSING FURNACE.

Application filed May 7, 1921. Serial No. 467,677.

The present invention relates to regenerative reversing furnaces and has for its object the increased efficiency of operation of the regenerators. The invention is illustrated as embodied in open hearth steel furnaces but may be embodied in other types of regenerative reversing furnaces. Such furnaces have two regenerators, one for the outgoing gases and the other for the incoming air. The outgoing gases of combustion have a high temperature and a considerably greater volume than the incoming air. The regenerators have to be built with sufficient space to take care of the large volume of outgoing gases. The regenerative space is therefore too large for efficient handling of the incoming air. When the incoming air is passed through the entire regenerative space, as has heretofore been the practice, the air tends to flow through a restricted area of the regenerator and to leave little, if any, circulation through other parts of the regenerator, such as the corners and sides. The volume of air is too small to sweep through the entire regenerator. As a consequence the heat is extracted from only that portion of the regenerator through which the incoming air takes its channel. There is, therefore, a large heat loss. When the furnace is reversed and the hot gases are passed out again through the regenerator, they find portions of the regenerator still at a comparatively high heat so that when the gases pass through the regenerator they are not reduced as much in temperature as they should be, or would be, if the entire regenerative space was properly cooled by the incoming air.

In order to efficiently utilize the entire regenerative space and to increase the temperature of the incoming air and decrease the temperature of the outgoing gases beyond what has heretofore been obtained, I pass the incoming air through different portions of the regenerator successively. I form the regenerators at the two ends of the furnace into sections or, where the regenerators are already built in sections, I utilize such sections. The outgoing gases are directed through all of the sections of the regenerator in parallel, thus providing sufficient space to accommodate their flow. The incoming air is first directed through one section of the regenerator to the furnace for a portion of the cycle of operation, and then directed through another section of the regenerator to the furnace. By so doing the area of the regenerative space through which the air flows is reduced and the air velocity increased to such a degree that the air flows through and scours out the entire regenerative space. The area is sufficiently reduced so that the air does not tend to form short circuiting channels through a portion only of the checker. The result is a more complete absorption of the heat from the checker and more economical operation of the furnace. As above stated, the cold incoming air has a volume considerably less than that of the hot outgoing gases. However, as the current of incoming air flows through but a single regenerator section at a time, its velocity is somewhere about that of the current of outgoing gases flowing through the regenerator sections in parallel; or in other words, the velocities of flow through the regenerators of the incoming air and outgoing gases are approximately equalized.

In the drawings which illustrate the preferred embodiment of the invention.

Figure 1 is a plan view partly in section of an open hearth furnace and its regenerative system;

Figure 2 is a vertical section through one end of the furnace, and

Figure 3 is a horizontal section through one end of a furnace illustrating a modification.

Referring to the illustrated embodiment of the invention, an open hearth furnace is indicated at 2. The furnace is provided with two regenerators 3 and 4, one regenerator serving to heat the incoming air and the other regenerator to absorb heat from the outgoing gases during half of the regenerative cycle after which the regenerators are interchanged, as is well known in the operation of such furnaces. Each of the regenerators is shown as having two sections $3^a$ and $3^b$, and $4^a$ and $4^b$, respectively. As is shown in Figure 1, each section is connected with the furnace chamber 5 by means of its own port. As shown in the drawings, the sections $3^a$ and $3^b$ of the regenerator 3 are connected with the furnace through the ports $6^a$ and $6^b$, respectively. Similarly, the sections $4^a$ and $4^b$ are connected with the furnace through the ports $7^a$ and $7^b$, respectively, at the other end of the furnace chamber. The ports are supplied with fuel through the usual burners, 8, such fuel being usually gas, such as coke oven gas or natural gas. The sections of the regenerator 3 are connected with a stack 9 through the pipes 10ª and 10ᵇ. Similarly, the sections of the other regenerator are connected with the stack through the pipes 11ª and 11ᵇ. These pipes are provided with the usual dampers marked 12ª, 12ᵇ, 13ª and 13ᵇ. The air is taken into the regenerators through the usual intake mushroom valves marked 14ª, 14ᵇ, 15ª and 15ᵇ, respectively.

The operation of the regenerators illustrated is as follows:—Suppose that the direction of flow through the furnace chamber is from left to right and a reversal to have just taken place. The dampers 13ª and 13ᵇ are both open so that the outgoing gases flow out through both ports 7ª and 7ᵇ through the entire regenerative space of the outgoing regenerator. One only of the valves 14ª or 14ᵇ is opened, say the valve 14ª, so that the incoming air flows only through the section 3ª of the regenerator 3 and is delivered to the furnace chamber through the single port 6ª. The velocity of the air is sufficiently increased through the regenerative space so that the flow takes place through the entire checker work of the section 3ª. Also, since the air is discharged into the furnace through a port having half the area of the two outlet ports, the velocity of the incoming air as discharged into the furnace is increased, so that a desirable blow-pipe action is obtained.

Usually an open hearth furnace is reversed every twenty minutes. Under such conditions, incoming air will flow through the regenerator section 3ª and port 6ª for ten minutes and will then be directed through the regenerator section 3ᵇ and port 6ᵇ for the next ten minutes. The gas burners 8 in each port will, of course, be turned on while the air is entering through such port and will be shut off when the air is shut off from the port. After the twenty minute half cycle is completed, the flow is reversed through the furnace. The outgoing gases then flow outwardly through both of the sections 3ª and 3ᵇ in parallel. The incoming air is then passed through the heated regenerator 4, utilizing the sections 4ª and 4ᵇ and their respective ports 7ª and 7ᵇ, successively.

In Figure 3 is illustrated a modification in which the section 3ª of the regenerator is connected to a middle port 15, while the section 3ᵇ is connected to two outside ports 16 and 17 through which the air and gases flow in parallel from and to the regenerator section 3ᵇ. The operation of this modification is similar to that shown in Figure 1. The outgoing gases pass out through all three ports 15, 16 and 17, while the incoming air passes in through the port 15 during the one-half of the half cycle, and through the ports 16 and 17 during the other half of said half cycle.

While the present invention has been illustrated as embodied in an open hearth steel furnace, the invention may be otherwise embodied within the scope of the following claims.

I claim:—

1. The method of operating a reversing furnace and its regenerators, which consists in passing the outgoing hot gases through substantially the entire regenerative space of one regenerator and passing the incoming air first through one portion and thereafter through another portion of the other regenerator, during each half regenerative cycle, and thereafter reversing the flow through the furnace and repeating the operation with the regenerators interchanged, and so on, substantially as described.

2. The method of operating a reversing furnace provided with regenerators having sections, which consists in passing the outgoing hot gases through the sections of one regenerator in parallel and in passing the incoming air first through one section of the other regenerator to the furnace and thereafter through another section of the regenerator, and thereafter reversing the flow through the furnace and repeating the operation with the regenerators interchanged, and so on, substantially as described.

3. The method of operating a reversing furnace and its regenerators which consists in maintaining a heat exchange between the outgoing hot gases and substantially all parts of one regenerator and causing a heat exchange between the incoming air and first one portion and thereafter another portion of the other regenerator, substantially as described.

4. The method of operating a reversing furnace and its regenerators which consists in approximately equalizing the velocities of flow through the regenerators of the incoming air and outgoing gases, substantially as described.

5. The method of operating a reversing furnace having two regenerators each consisting of a plurality of sections, which includes directing the outgoing hot gases through the sections of either regenerator in parallel and directing the incoming air first through one section of the other regenerator and then through another section of said regenerator, substantially as described.

6. The method of operating a furnace provided with regenerators having sections, which consists in passing the outgoing gases through the sections of a regenerator in parallel, and passing the incoming air through the sections of the regenerator one at a time.

7. The method of operating a furnace provided with regenerators, which consists in heating a regenerator by passing the hot outgoing gases through substantially its entire regenerative space, and thereafter utilizing said regenerator to pre-heat the incoming air by passing the incoming air for a period through one portion of the regenerator and passing the incoming air for another period through another portion of the regenerator.

8. The method of operating a furnace provided with regenerative chambers which consists in passing the outgoing gases through a plurality of regenerative chambers in parallel to heat such chambers, and passing the incoming air through a heated regenerative chamber for a period and afterward through another heating regenerative chamber for another period.

9. The method of operating a furnace provided with a plurality of regenerative chambers at each end of the furnace connected to the furnace through different ports, which consists in passing the outgoing gases through a plurality of the chambers and their ports in parallel to heat such chambers, and thereafter passing the incoming air through a heated regenerative chamber and its port for a period and afterward through another heated regenerative chamber and its port for another period.

10. A regenerative reversing furnace having a combustion chamber, a plurality of regenerative chambers for each end of the furnace, means for passing the incoming air through one regenerative chamber and afterward through another regenerative chamber in the same end of the furnace, and means for directing the gas in each case towards substantially the same portion of the combustion chamber.

11. A regenerative reversing furnace having a combustion chamber, a plurality of regenerative chambers at each end of the furnace having independent ports connecting them with the combustion chamber, means for passing the incoming air through one regenerator and afterward through another regenerator at the same end of the furnace, the several ports being arranged to direct the air toward substantially the same portion of the combustion chamber.

12. A regenerative reversing furnace comprising a combustion chamber, a plurality of regenerative chambers connected to each end of the furnace and connected thereto by valveless passages, and means for controlling the passage of heated gases and incoming air through the regenerative chambers comprising valves at the cold ends of the regenerative chambers.

13. A regenerative reversing furnace comprising a combustion chamber, a plurality of regenerative chambers connected to each end of the furnace, means acting to withdraw the hot gases from the furnace through the regenerative chambers in parallel and to direct the incoming air through a part only of the regenerative chambers at the same time, comprising valves at the cold ends of the regenerative chambers.

In testimony whereof, I have hereunto set my hand.

JULIAN KENNEDY.